Figure 1:
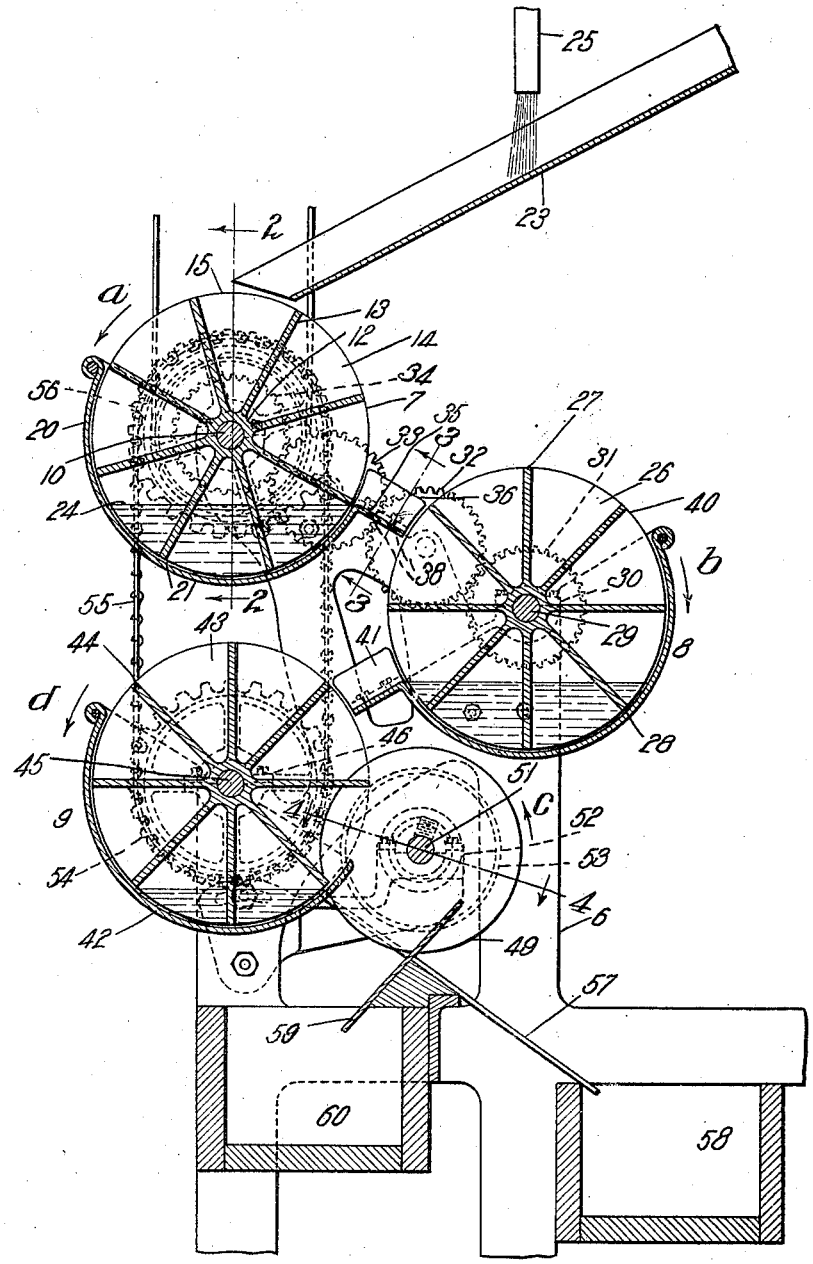

F. D. CLEVELAND.
METHOD OF POSITIONING FISH.
APPLICATION FILED JULY 3, 1913.

1,078,720.

Patented Nov. 18, 1913.

3 SHEETS—SHEET 1.

F. D. CLEVELAND.
METHOD OF POSITIONING FISH.
APPLICATION FILED JULY 3, 1913.
1,078,720.
Patented Nov. 18, 1913.
3 SHEETS—SHEET 2.
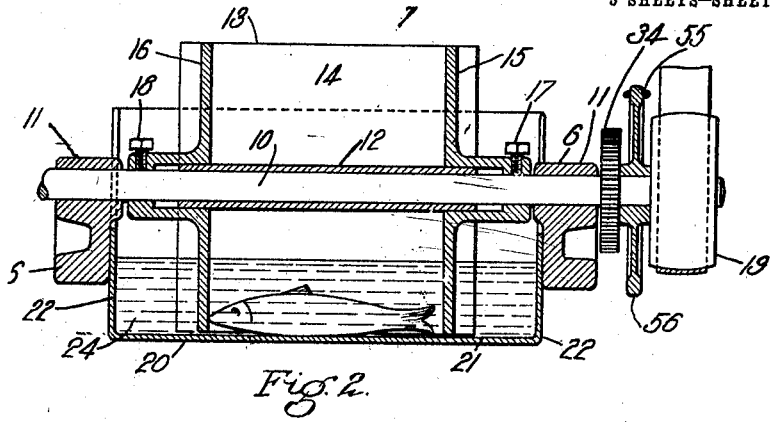
Fig. 2.
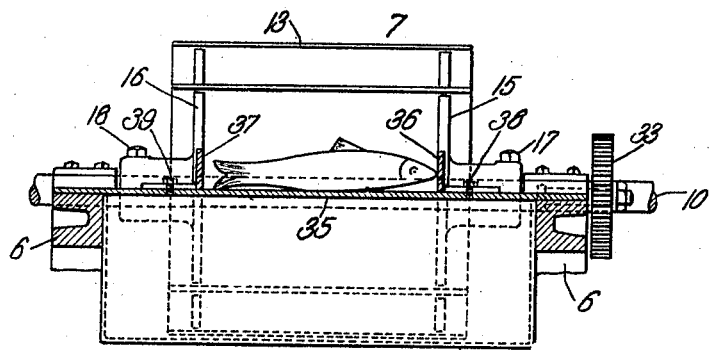
Fig. 3.
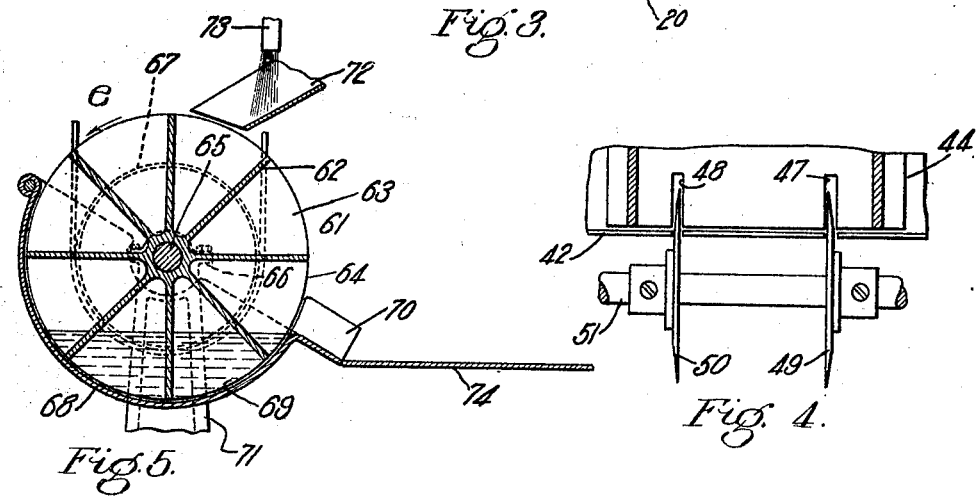
Fig. 5.
Fig. 4.
Witnesses:
Leonard A. Powell.
Sydney E. Taft.
Inventor:
Francis D. Cleveland.
by his attorney

F. D. CLEVELAND.
METHOD OF POSITIONING FISH.
APPLICATION FILED JULY 3, 1913.

1,078,720.

Patented Nov. 18, 1913.

3 SHEETS—SHEET 3.

Witnesses:
Leonard A. Powell
Sydney E. Taft

Inventor:
Francis D. Cleveland

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

METHOD OF POSITIONING FISH.

1,078,720.

Specification of Letters Patent. Patented Nov. 18, 1913.

Application filed July 3, 1913. Serial No. 777,189.

*To all whom it may concern:*

Be it known that I, FRANCIS D. CLEVELAND, a citizen of the United States, residing at Winchester, in the county of Middlesex and State of Massachusetts, have invented new and useful Improvements in Methods of Positioning Fish, of which the following is a specification.

This invention relates to an improved method of positioning fish for the purpose of delivering them in a certain position to a conveyer or receptacle and for positioning them so that their heads and tails may be severed by suitable cutting means preparatory to being canned.

The method is particularly adapted for positioning fish, such as sardines, for the purpose hereinbefore set forth.

Applicant has discovered by practical use that fish when pushed sidewise thereof through a body of water located in a suitable receptacle will move in the direction in which their heads may be pointed. In order to utilize this discovery for the purpose of positioning fish he has embodied his invention in a mechanism wherein a receptacle containing a body of water has a pair of oppositely disposed gages located adjacent thereto and suitable means for pushing fish sidewise through said body of water in said receptacle, the result being that the fish will move in the direction in which their heads are pointed toward said gages until their noses rest against said gages, some of the fish moving in one direction and some in the opposite direction according to the direction in which their heads happen to be pointed when they are moved in the receptacle.

The invention broadly stated, therefore, consists in the method of positioning fish which consists in pushing them sidewise through a body of liquid and further the invention consists of the method of positioning fish which consists in pushing them sidewise through a body of liquid between a pair of gages, whereby said fish will move toward said gages in the direction in which their heads may be pointed.

The invention finally consists in the method hereinafter described and particularly set forth in the claims.

In carrying my improved method into practical operation I utilize a machine in which a body of water is contained in a receptacle and means are provided for pushing the fish sidewise through said body of water, together with a pair of gages against which the fish are adapted to be moved as they are pushed through said water and whereby they are positioned ready to be delivered to any suitable receptacle or to be first brought into engagement with suitable cutting means for removing the heads and tails thereof, after which they may be delivered to a suitable receptacle or carrier.

The mechanism for pushing the fish may be a rotary member provided with blades or it may be an endless chain provided with blades adapted to engage the fish or it may be a reciprocatory member adapted to engage the fish and push them sidewise in the body of water, but in each case there must be a body of water contained within a receptacle and means to push the fish through this body of water sidewise thereof.

In the preferred embodiment of my invention I utilize a rotary conveyer, said rotary conveyer having pockets in its periphery. The fish are delivered to these pockets at right angles to the length of the pockets and in the direction of the length of the fish and said fish are positioned when they leave the rotary conveyer parallel to the length of said pockets. A single rotary conveyer may be utilized if that is sufficient to place the fish with their noses against the gages or a plurality of rotary conveyers may be employed. Each of the conveyers, whether one or a plurality is used, in the preferred form of machine used in positioning fish in accordance with my invention, is provided with a shield thereunderneath which is adapted to contain water and as the fish are pushed by the conveyer through the water contained in the shield and pushed along by the partitions between the pockets in said conveyer, they will keep moving in whichever direction their heads may be pointed, until finally they arrive with their noses against the gages which are provided adjacent to the ends of said pockets.

If desired cutting means may be employed in combination with the rotary conveyer or placing wheel to remove the heads and tails, but in certain instances it is desirable to position fish without the cutters, as, for instance, when they are delivered to "flakes" to be dried, in which case the rotary conveyer may be used with the shield containing water and located therebeneath without using any cutting means.

Figure 6:
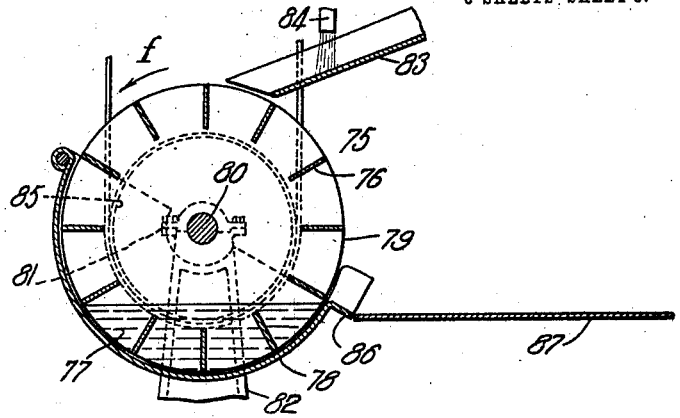
Figure 7:
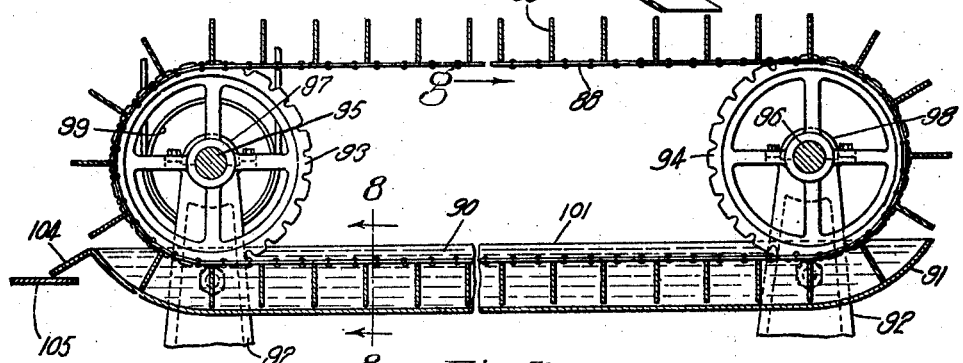
Figure 8:
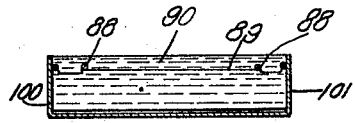
Figure 9:
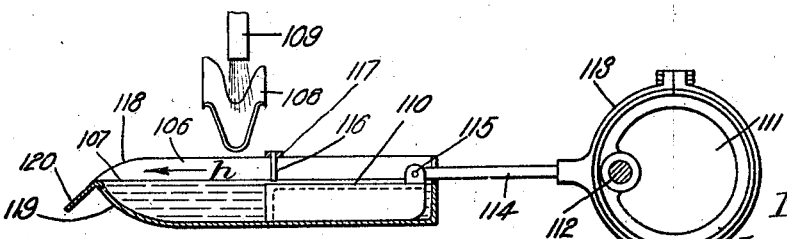

Referring to the drawings: Figure 1 is a sectional elevation of a machine adapted to position and cut fish in accordance with my improved method. Fig. 2 is a detail sectional elevation of one of the conveyers and its shield taken on line 2—2 of Fig. 1. Fig. 3 is a detail sectional elevation taken on line 3—3 of Fig. 1. Fig. 4 is a detail sectional elevation taken on line 4—4 of Fig. 1. Fig. 5 is a detail sectional elevation showing a single rotary conveyer with its shield adapted to contain water. Fig. 6 is a sectional elevation of a modified form of machine adapted to carry into practical operation my improved method of positioning fish. Fig. 7 is a sectional elevation of another modified form of machine adapted to position fish by my improved method. Fig. 8 is a detail section taken on line 8—8 of Fig. 7. Fig. 9 is a sectional elevation of another modified form of machine whereby my invention may be carried into practical operation.

Like numerals refer to like parts throughout the several views of the drawings.

In the drawings, Figs. 1 to 4 inclusive, 6 is the frame of the machine; 7, 8 and 9 are rotary conveyers for the fish. The rotary conveyer 7 is fastened to a shaft 10 journaled in bearings 11 on the frame of the machine. The conveyer 7 consists of a hub 12 having a series of radial partitions 13 fast thereto which separate a series of pockets 14 one from the other. These pockets are adapted to receive fish and are provided at the opposite ends thereof with annular flanges, constituting gages, 15 and 16. Said gages are adjustably fastened to the shaft 10 by set-screws 17 and 18, respectively. It will be noted that the rotary conveyer 7 is adapted to move in the direction of the arrow $a$ (Fig. 1) and that the pockets 14 located in its periphery extend transversely of the path of motion of said rotary conveyer. A rotary motion is imparted to the shaft 10 by a pulley 19 fast thereto. A shield 20 having a bottom 21 and side flanges 22 is fastened to the frame 6. This shield is so formed as to contain water and is located beneath the conveyer 7, with the inner face of the bottom 21 adjacent to the periphery of said conveyer, the bottom thereof extending on opposite sides of a vertical plane containing the median axial line of said conveyer, so that water will always stand in said shield, and when the fish are carried around in the pockets of the rotary conveyer 7 they will plunge into this water contained in the shield 20 and will move in the direction in which their heads are pointed toward the gages 15 and 16, respectively. Fish are delivered to the pockets of the conveyer 7 by a chute 23 down which they pass longitudinally thereof and transversely of the pockets 14 or of the shaft 10. When the fish pass from the chute 23 into the pockets 14 they fall into said pockets and turn with their heads pointing in one direction or the other lengthwise of said pockets, ready to be carried into the water 24 contained in the shield 20. Water is supplied to the chute 23 by a suitable pipe 25. It will be noted that the pockets 14 are practically water-tight, so that the water which is delivered to said pockets from the chute 23 will be carried around in said pockets and delivered into the shield 20, the pockets opening out of the periphery of the conveyer 7, so that the water can be delivered, together with the fish, into said pockets from the chute 24 and delivered by said pockets into the shield 20.

The conveyer 8 is substantially the same as the conveyer 7. It is provided with pockets 26, partitions 27, and a shield 28 and is fastened to a shaft 29 rotatable in suitable bearings 30 on the frame of the machine. A rotary motion is imparted to said conveyer in the direction of the arrow $b$ by a gear 31 which is rotated by a gear 32 meshing into a gear 33 which, in turn, meshes into a gear 34 fast to the shaft 10. A chute 35 leads from the shield 20 to the conveyer 8 (see Figs. 1 and 3) and is provided with adjustable flanges 36 and 37, said flanges being adjustably fastened to the chute 35 by screws 38 and 39, respectively. The flanges 36 and 37 are set in alinement with the flanges 15 and 16 on the rotary conveyer 7 and also in alinement with like flanges 40 on the conveyer 8. Another chute 41 leads from the shield 28 to the conveyer 9 and a shield 42 similar to the shield 20 is located beneath the rotary conveyer 9. Said rotary conveyer 9 is substantially the same as the conveyers 7 and 8, having pockets 43, partitions 44 and being fastened to a shaft 45 journaled in suitable bearings on the frame of the machine. The partitions 44 of the conveyer 9, however, are slotted at 47 and 48 to receive the rotary cutters 49 and 50, respectively. Said rotary cutters are fastened to a shaft 51 journaled to rotate in suitable bearings 52 on the frame of the machine. Said cutters have a rotary motion imparted thereto in the direction of the arrow $c$ by a pulley 53. A rotary motion is imparted to the conveyer 9 by a sprocket gear 54 fast to the shaft 45 and connected by a sprocket chain 55 to a sprocket gear 56 fast to the shaft 10, thus imparting to the rotary conveyer 9 a motion in the direction of the arrow $d$. The heads and tails after they have been severed pass down a chute 57 into a receptacle 58, while the bodies pass down a chute 59 into a receptacle 60.

The general operation of the mechanism hereinbefore specifically described and illustrated in Figs. 1 to 4 inclusive of the drawings is as follows: The fish pass down the chute 23 with their bodies extending longitudinally of said chute and are carried along in said chute by a stream of water from a pipe 25. Said fish drop from the chute 23 into the pockets of the rotary conveyer 7 as said rotary conveyer is rotating in the direction of the arrow $a$ and are carried, together with the water in said pockets, which is supplied by the chute 23, around in the direction of said arrow and into the body of water 24 contained in the shield 20. As the conveyer is rotated the fish are carried into this body of water and slide down the partitions 13, with their heads pointed either toward the gages 15 or 16 and in whichever direction they may be pointed they will move toward said gages as they are pushed through the water 24 by the partitions 13. The partitions 13 carry the fish up along the inner face of the shield 20 until they arrive at the chute 35 down which they pass into the pockets 26 of the rotary conveyer 8. They are then carried around by said rotary conveyer in the direction of the arrow $b$ into the water contained in the bottom of the shield 28, and as they enter the water in said shield and are pushed along by the partitions 27 they will move in whichever direction their heads may be pointed toward the flanges 40 which constitute gages on the rotary conveyer 8. From said shield 28 they will be pushed by the partitions 27 onto the chute 41 and will pass down said chute into the pockets 43 of the conveyer 9. The partitions 44 of said conveyer will push the fish around through the water located in the shield 42 and against the rotary cutters 49 and 50. The heads and tails of the fish will, at this time, be severed from the bodies and said heads and tails will pass down the chute 57 into the receptacle 58, while the bodies pass down the chute 59 into the receptacle 60.

In Fig. 5 the machine illustrated embodies a single rotary conveyer with a shield at the bottom thereof adapted to contain water. Referring to said Fig. 5, 61 is a rotary conveyer movable in the direction of the arrow $e$. Said rotary conveyer has a series of partitions 62 which separate the pockets 63 from each other and is provided with end flanges, constituting gages, 64. The conveyer 61 is fastened to a shaft 65 journaled in suitable bearings 66 and having a pulley 67 fast thereto by means of which it is rotated. Beneath the conveyer 61 is located a shield 68 having its inner face adjacent to the periphery of the conveyer 61 and adapted to contain a body of water 69, said shield having an outlet chute 70 and being fastened to the frame 71. The fish are delivered to the rotary conveyer 61 by a chute 72 which is supplied with water from a pipe 73. The device is operated by rotating the conveyer 61, by means of the pulley 67, in the direction of the arrow $e$, and as the fish pass down the chute 72, they will be delivered, together with the water from the pipe 73, into the pockets 63 of the conveyer 61 and are carried around by the conveyer 61 into the shield 68. As they pass through the water 69 in the bottom of said shield, they will move in the direction in which their heads are pointed toward the annular gages 64 and will be delivered down the chute 70 onto any suitable receptacle 74, it being noted that as the fish enter the conveyer 61 they are located with their length extending transversely of the shaft 65 and of the length of the pockets 63, but they are delivered from said pockets with their length extending longitudinally thereof.

In Fig. 6 the machine illustrated is embodied in a single rotary member 75 with blades 76 thereon constituting means for pushing fish through a body of water contained in a recepacle 78. The rotary member 75 is provided with end flanges 79 constituting gages and is fastened to a shaft 80 rotatable in a suitable bearing 81 in the frame 82. The fish are delivered to the rotary member 79 by a chute 83 to which water is supplied by a pipe 84. The water and fish pass down the chute 83 and fall between the blades 76 and the flanges 79 into the body of water 77 in the receptacle 78. The member 75 is rotated in the direction of the arrow $f$ by a pulley 85 fast to the shaft 80. As said member is rotated in the direction indicated, the blades 76 pass through the body of water 77, pushing the fish sidewise thereof along the inside of the receptacle 78. As said fish are pushed along said receptacle in the water 77 they will move in the direction in which their heads are pointed until their noses come up against the gages 79. Upon continued rotation of the member 75 the fish will be pushed out of the receptacle 78 and will slide down the inclined portion 86 of said receptacle onto a suitable receptacle 87.

In Figs. 7 and 8 a machine is illustrated whereby my improved method is carried into practical operation in which is embodied an endless conveyer 88 with blades 89 thereon constituting means whereby fish may be pushed through a body of water 90 located in the receptacle 91 which is supported upon a frame 92. Motion is imparted to the endless conveyer 88 in the direction of the arrow $g$ by sprocket wheels 93 and 94 which are fastened to shafts 95 and 96, respectively, journaled in bearings 97 and 98 on the frame 92. A rotary motion is imparted to the shaft 95 by a pulley 99. The receptacle 91 is provided on its opposite sides with flanges 100 and 101, constituting gages, to determine the position of the fish. The fish are fed into the receptacle 91 by a chute 102, to which water is supplied by a pipe 103, and said fish move down the chute 102 in the direction of their length and with the water from the pipe 103 pass between the blades 89 and downwardly into the receptacle 91 along which they are pushed by the pusher blades 89. As the fish are pushed through the water they will assume positions extending longitudinally of the blades 89 and will move in the direction in which their heads are pointed until their noses rest against the gages 100 and 101, respectively. As the conveyer 88, with its blades 89, pushes the fish along through the body of water 90 they will finally arrive at the end of the receptacle 91 at the left of Fig. 7 and will slide down the inclined portion 104 onto a suitable receptacle 105.

In Fig. 9 a machine is illustrated whereby my improved method may be carried into practical operation in which there is a receptacle 106 containing a body of water 107 and the fish are supplied to said receptacle by an inclined chute 108 to which water is supplied by a pipe 109. The fish enter the receptacle 106 at an angle thereto, passing lengthwise thereof down the chute 108 and into the body of water 107. After being fed into the receptacle 106 they are pushed through the water in said receptacle sidewise thereof in the direction of the arrow $h$ by a pusher 110, to which a reciprocatory motion is imparted by an eccentric 111 fast to a shaft 112. An eccentric strap 113 is connected by an eccentric rod 114 to the pusher 110 by means of a pin 115. A stationary scraper 116 is fastened to a crossbar 117 which, in turn, is fastened to the opposite sides 118 of the receptacle 106, said sides 118 constituting gages against which the noses of the fish are adapted to contact.

The operation of the device is as follows: The fish pass lengthwise thereof down the chute 108 and are floated down said chute by water from the pipe 109. They are thus delivered to the receptacle 106 transversely thereof and are pushed along in the body of water 107 by the pusher 110, to which a reciprocatory motion is imparted by the eccentric 111. As the fish are pushed sidewise thereof by the pusher 110 in the receptacle 106 they will move in the direction in which their heads are pointed until said heads contact with the gages 118. Finally the pusher will push said fish up against the inclined end 119 of the receptacle 106 and said fish will then pass outwardly onto an inclined chute or guide 120, down which they slide to any suitable receptacle or conveying means.

Having thus described my invention, what I claim and desire by Letters Patent to secure is:

1. The method of positioning fish which consists in pushing them sidewise through a body of liquid.

2. The method of positioning fish which consists in pushing them sidewise through a body of liquid between a pair of gages, whereby said fish will move toward said gages in the direction in which their heads may be pointed.

3. The method of positioning fish which consists in pushing them sidewise through a body of liquid and out of said body of liquid onto a receptacle therefor.

4. The method of positioning and cutting fish which consists in pushing them sidewise through a body of liquid and subsequently against suitable cutting means, whereby their heads and tails may be severed from their bodies.

In testimony whereof I have hereunto set my hand in presence of two subscribing witnesses.

FRANCIS D. CLEVELAND.

Witnesses:
 CHARLES S. GOODING,
 SYDNEY E. TAFT.